WILLIAM VAN DEN HEUVEL.
SPIRAL CUTTER.
APPLICATION FILED MAR. 8, 1920.
1,363,444.
Patented Dec. 28, 1920.
3 SHEETS—SHEET 2.
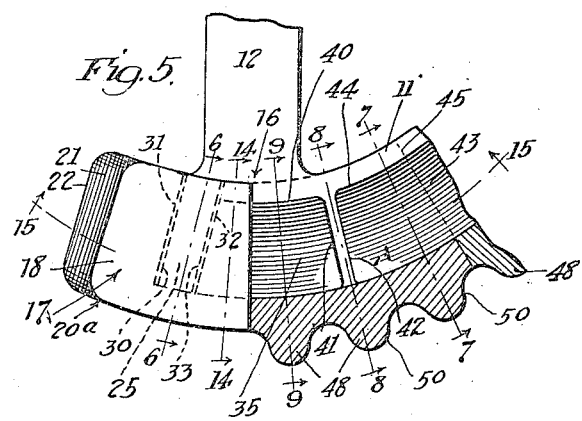
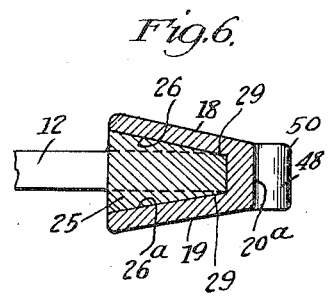
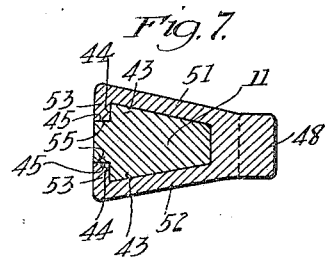
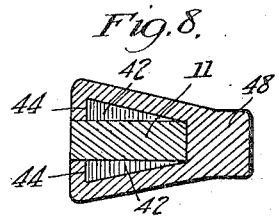
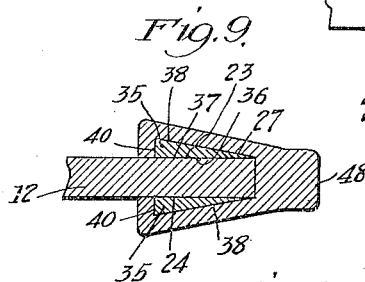
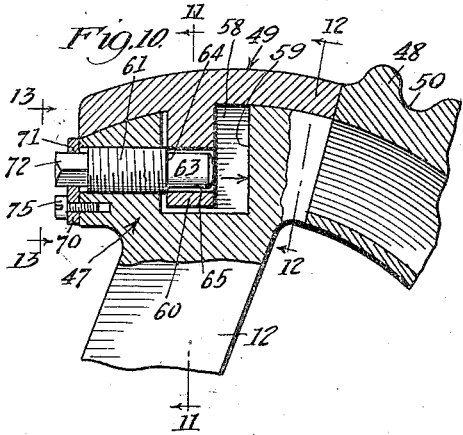
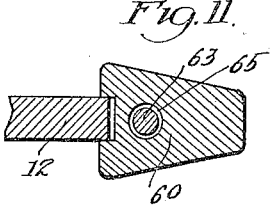
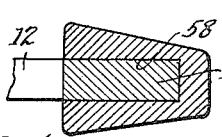
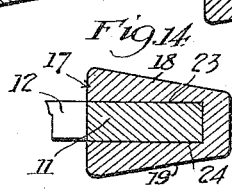
Inventor:
William van den Heuvel
by
his Attorney

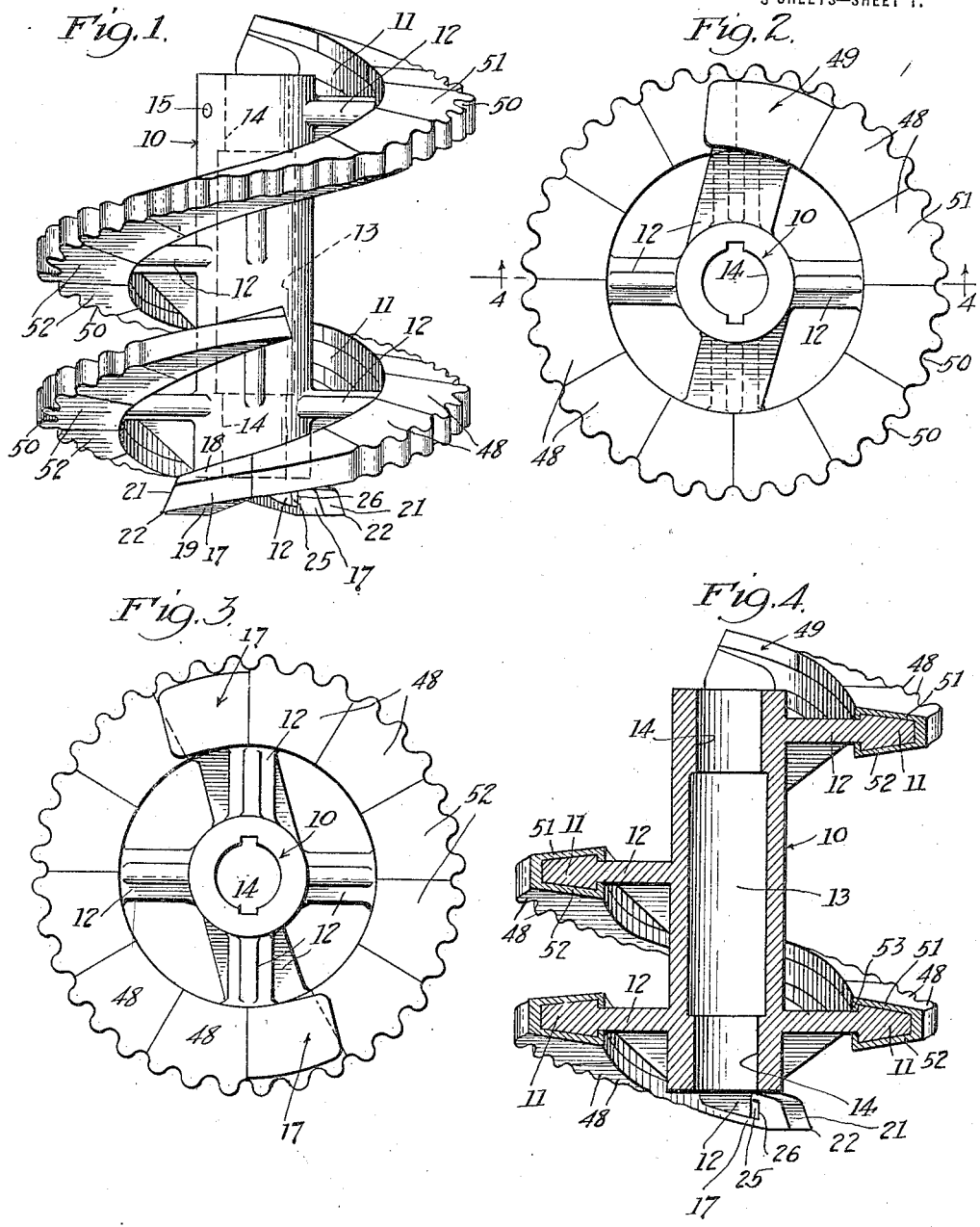

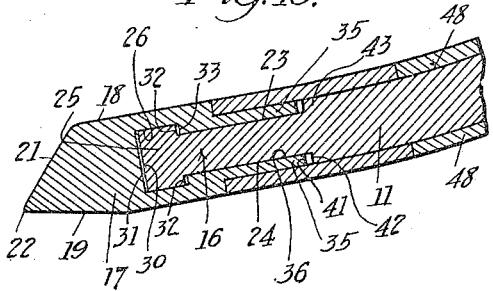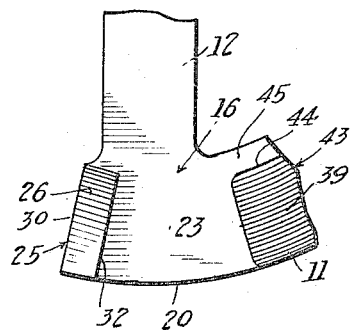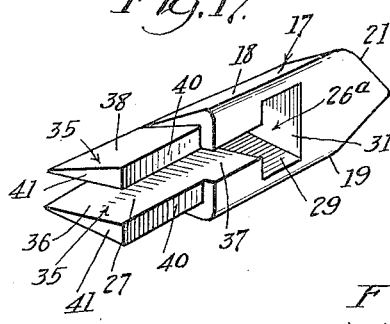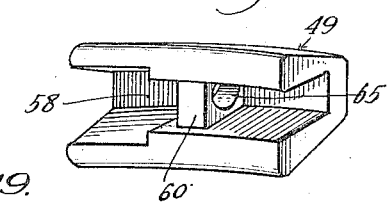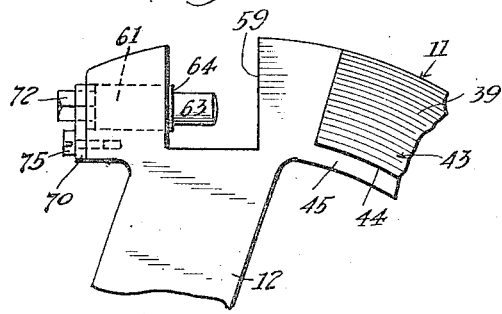

UNITED STATES PATENT OFFICE.

WILLIAM VAN DEN HEUVEL, OF LOS ANGELES, CALIFORNIA, ASSIGNOR TO LYTLE S. ADAMS, OF LOS ANGELES, CALIFORNIA.

SPIRAL CUTTER.

1,363,444.

Specification of Letters Patent.   Patented Dec. 28, 1920.

Application filed March 8, 1920. Serial No. 364,321.

*To all whom it may concern:*

Be it known that I, WILLIAM VAN DEN HEUVEL, a subject of Holland, residing at Los Angeles, in the county of Los Angeles, State of California, have invented new and useful Improvements in Spiral Cutters, of which the following is a specification.

This invention relates to spiral cutters and particularly to spiral cutters for cultivators. An object of the invention is to provide an effective armored cutter, that is a cutter with removable cutting members or teeth to take wear and which may be easily and cheaply renewed.

This invention relates particularly to spiral cutters for use in cultivators of the general character set forth in the co-pending application of Lytle S. Adams, entitled "Cultivators" filed January 21, 1919, Serial No. 272,291. When used in connection with machines of this character the cutter acts as a soil disturbing or cultivating member. It will be understood, however, that the cutter provided by the invention is not in any way restricted to use in this class of machinery but that it may be effectively and advantageously used in various other classes of machinery and for cutting or disturbing materials other than soils. For instance, the cutter may be advantageously used in dredging and excavating machinery of various kinds without material modifications or alterations and without departing from the spirit of the invention.

A particular object of the invention is to provide a spiral cutter, of the general character specified, which has removable wearing or cutting teeth. The flights of the cutter are provided with armor or removable teeth so that their deterioration due to attrition is negligible. The life of the cutter, as a unit, may be indefinitely prolonged by occasional re-arrangement and replacement of the teeth.

A particular feature of the cutter is the manner in which the teeth are mounted on the frame or flights. The construction is such that the cutter presents no exposed bolts, catches or detent means, in connection with the teeth to hold them in place, in fact, the teeth are interlocking and thereby make it necessary to use one screw in the entire construction and this screw is so located that it is not exposed or subjected to wear. Further, the secure and effective construction of the cutter is extremely simple and inexpensive. The cutter can be easily and quickly assembled or repaired and requires no particular skill or special apparatus for such operations.

Although, I herein refer to the device, provided by the present invention, as a cutter and further refer to its having cutting members or teeth I do not mean that the device is necessarily strictly a cutter. In practical operation the device is rotated at a comparatively high rate of speed, say five hundred revloutions per minute, thereby causing it to abrade rather than cut. However, the device is also applicable to being rotated slowly so that it has a true cutting action.

Other objects and features of the invention will be understood from the following detailed description wherein I set forth a preferred embodiment of the invention and throughout which reference is had to the accompanying drawings, in which—

Figure 1 is a side elevation of the complete cutter; Fig. 2 is a top elevation, or plan view, of the cutter; Fig. 3 is a bottom plan view, or elevation, of the cutter; Fig. 4 is a vertical central section taken as indicated by line 4—4 on Fig. 2; Fig. 5 is an enlarged plan view of the lower end portion of one of the flights, showing only the end tooth in place; Fig. 6 is a sectional view taken as indicated by line 6—6 on Fig. 5; Fig. 7 is a sectional view taken as indicated by line 7—7 on Fig. 5; Fig. 8 is a sectional view taken as indicated by line 8—8 on Fig. 5; Fig. 9 is a sectional view taken as indicated by line 9—9 on Fig. 5; Fig. 10 is a plan view of the top end portion of one of the flights with parts broken away to show in section; Fig. 11 is a sectional view taken as indicated by line 11—11 on Fig. 10; Fig. 12 is a sectional view taken as indicated by line 12—12 on Fig. 10; Fig. 13 is a view taken as indicated by line 13—13 on Fig. 10; Fig. 14 is a sectional view taken as indicated by line 14—14 on Fig. 5; Fig. 15 is a detail section taken as indicated by line 15—15 on Fig. 5; Fig. 16 is a plan view of the lower end of the flight showing it with the teeth removed; Fig. 17 is a perspective view of an end tooth showing it removed from the flight and viewed from its inner side; Fig. 18 is a perspective view of a locking tooth showing it removed from the flight and viewed from its inner side; and Fig. 19 is a plan view of the top end of a flight showing it with the teeth removed.

Throughout the drawings numeral 10 designates the hub of the cutter from which extends spokes 12 which support the helical shaped ribbon flights 11. In the preferred form of construction the hub 10, spokes 12, and flights 11 are formed integrally, being a casting, preferably steel, which forms the body or frame of the cutter.

The hub 10 is arranged concentrically within the flights 11 and has a central longitudinal opening 13. The ends 14 of the opening 13 are bored or otherwise machined to fit the spindle of the machine on which the cutter is to be mounted. The opening 13 receives the spindle of the machine so that the bored portions 14 of the opening 13 accurately fit the spindle. A suitable hole 15 extends radially through the wall of the hub 10, at one of the bored portions 14, and is adapted to receive a shear pin by which the cutter is locked on the spindle. It will be understood that this particular construction or design of hub 10 is merely for purpose of illustration and that the invention, therefore, is not limited or restricted to it, but that other suitable hub constructions may be advantageously employed.

The flights 11, of which there are two arranged concentrically, are helical in shape, are of the same diameter, and are like in their cross sectional configurations and end constructions, but differ in length. The lower ends of the two flights are even or in the same horizontal plane and are diametrically opposite each other relative to the axis of the cutter. The pitch of both of the flights being the same they extend upwardly together so that corresponding points on the two flights are diametrically opposite each other. The shorter flight 11 extends only approximately 180° around the axis of the cutter and therefore extends only a comparatively short distance upwardly causing the upper end of the longer flight to be considerable distance above the upper end of the shorter one. The two flights being different in length and arranged in the manner just set forth, form a cutter with a double spiral at its lower end and a single spiral at its upper end. It has been found in practice that this construction or arrangement of spirals or flights is particularly effective, and under certain circumstances, necessary for proper operation, or action. The most important feature gained by this arrangement of flights is balance. When the cutter is used in a cultivator of the general character above referred to, it is particularly desirable to balance the lower portion of the cutter but the upper portion, it has been found does not necessarily have to be balanced. In view of the fact that applicant is herein setting forth his invention in connection with a cutter particularly adapted for use in cultivators it will be understood that the invention is not necessarily limited or restricted to this particular arrangement of flights 11 and further it will be understood that applicant does not necessarily limit himself to any specific numbers of flights 11. It will be also understood that the cutter may be made with either left-handed or right-handed flights without departing from the invention.

The details of shape and construction of the two flights 11 are identical so I will proceed to set forth the details of only one of the flights it being understood that such description is applicable to both of them.

The lower end portion 16 of the flight 11 is somewhat below the lower end of the hub 10, to provide clearance for the lower end of the hub when the cutter is being advanced horizontally through soil, or the like. The end tooth 17 is carried on the end portion 16 of the flight. The end portion 16, of the flight 11, has parallel top and bottom surfaces 23 and 24, respectively, except at its extreme end where there are projections 25 the outer surfaces 26 of which diverge inwardly from the edges of the periphery or outer wall 20 of the flight as shown in Figs. 6 and 16. The lower end walls the projections 25 are parallel with each other, are in the same vertical plane, and are in the same plane as the extreme end wall of the flight and are connected by the end wall of the flight forming a flat vertical wall 30 at the extreme end of the flight. The upper end walls 32 of the projections 25 are parallel with the end walls just referred to and extend between the outer surfaces 26 and the parallel surfaces 23 and 24.

The end tooth 17, which is preferably a cast steel member, has inwardly diverging top and bottom surfaces 18 and 19. The outer face or wall 20$^a$, of the end tooth 17, is smooth slightly curved, and forms a vertical wall which connects the outer edges of the top and bottom surfaces 18 and 19. The advancing or leading end wall 21, of the tooth 17, is arranged substantially radially relative to the axis of the cutter and extends forwardly and downwardly from the front edge of the upper surface 18 and connects with the front edge of the lower surface 19 forming a cutting edge 22. The end tooth 17 is provided with a recess 26$^a$ which receives and fits over the projections 25, and also a recess 27 which receives and fits over the main portion of the end portion 17, or, in other words that part of the end portion 17 which has parallel top and bottom surfaces. The projections 25 make it necessary, in order to place the end tooth on the flight, to move it radially inwardly over the projections 25 and in a plane parallel with the surfaces 23 and 24. The recess 26$^a$ has a vertical end wall 31 which engages the end wall 30 of the flight, vertical walls 33 which engage the upper end walls 32 of the projection, and inwardly diverging top and bottom walls 29 which engage and fit the outer surfaces 26 of the projections 25. The recess 27 has two parallel flat surfaces 37 which engage the parallel surfaces 23 and 24 of the flight. It will be understood how the end tooth 17 when placed on the flight 11, as shown in the various figures of the drawings, is prevented from moving upwardly around, or on, the flight by the extreme end wall 30 of the flight engaging the wall 31 of recess 26, and how it is prevented from moving downwardly and off of the flight 11 by the walls 32 of projections 25 engaging walls 33 of recess 26.

It will be noted in the drawings particularly in Figs. 5, 9, 15 and 17 that there is a pair of flanges or projections 35 extending from the end tooth 17 so as to engage and cover the surfaces 23 and 24 of the end portion 16. The projections 35 are wedge shaped members the inner faces 36 of which are parallel and engage the surfaces 23 and 24 of end portion 16, as clearly shown in Figs. 9 and 15 of the drawings. The outer surfaces 38 of the projections 35, however, diverge inwardly. The walls 40 of the projections 35 connect the inner and outer surfaces 36 and 38 and are vertical or perpendicular relative to the surfaces 23 and 24 of the flight. The upper or outer ends 41 of the projections 35 face the lower ends 42 of projections 43 formed on the sides of the flight 11.

The projections 43 are the same in shape and size as the projections 35 differing from the projections 35, however, in that they are formed integral with the flight 11. As a matter of fact, the projections 43 being formed on the flight 11 makes its cross sectional configuration resemble more or less an arrowhead as shown in Fig. 7 of the drawings. The outer diverging surfaces 39 of the projections 43 form continuations of the outer surfaces 38 of projections 35. The inner vertical walls 44 of the projections 43 are perpendicular relative to the parallel surfaces 45 of the flight 11 and form continuations of the inner walls 40 of projections 35. The projections 43 extend from the lower end portion 16 of the flight 11 to the upper end portion 47 of the flight 11 and are uniform in size and configuration throughout their entire length.

A plurality of teeth 48 are carried on the flight 11 between the end tooth 17 and locking tooth 49, which is arranged at the upper end of the flight. The teeth 48 are uniform in size and shape and have comparatively blunt notched or serrated faces or outer edges 50, and inwardly diverging top and bottom walls 51 and 52. The top and bottom walls of the teeth 48 diverge inwardly at the same angle as do the outer surfaces of the projections 35 and 43. Inwardly extending flanges 53 are formed at the inner edges of the inwardly diverging walls 51 and 52, of the teeth 48, as clearly shown in Figs. 7, 8 and 9 of the drawings. The teeth 48 are so proportioned that the walls 51 and 52 thereof fit over the projections 43, on the flight 11 and so that the flanges 53 engage the inner walls 44 of the flanges 43, thereby positively preventing removal or displacement of the teeth 48 from the flight in a radial direction. In practice, the ends 55 of the flanges 53 engage the surfaces 45 of the flight 11 in the manner shown in Fig. 8 of the drawings. The teeth 48, however, fit the flight 11 loosely enough to allow them to be slid or moved longitudinally thereon.

The teeth 48 are placed on the flight 11 from its upper end are slid downwardly and around on the flight until the first tooth 48 to be placed on the flight abuts or engages the end tooth 17, and so that adjacent teeth 48 abut or engage each other and form a continuous housing or casing for the flight 11. It will be particularly noted in Figs. 5 and 15 of the drawings, that the tooth 48 which abuts the end tooth 17 extends over and covers the projections 35, which extends from the tooth 17, and also extends over and covers the end portions of the projections 43 on the flight 11. This engagement of the projection 35 and the end portions of the projections 43 by a single tooth 48 locks the end tooth on the flight against being removed radially therefrom. This locking of the end tooth combined with the locking caused by the coöperation of projections 25 and the recess 26 causes the end tooth 17 to be positively locked on the flight so that it can not be moved either longitudinally or radially. It will be readily understood how the teeth 48, when placed on the flight 11 to form a continuous housing or cover for the flight, as shown in Figs. 1, 2 and 3 of the drawings, protect the flight 11 from wear or injury at the same time being neat, simple to manufacture, and effective.

When teeth 48 have been placed on the flight 11, until the entire length of the flight, except for the upper end portion 47, is covered, the locking tooth 49 is placed in position on the end portion 47 to prevent displacement or longitudinal movement of the teeth 48 on the flight 11. The cross sectional configuration of the end portion 47 of the flight 11 is substantially rectangular and the locking tooth 49 is provided with a rectangular recess 58 to receive the end portion 47 of the flight thereby permitting the tooth 49 to be placed over the end portion 47. There is a comparatively large notch 59, in the periphery or outer wall of the end portion 47, which receives a lug 60 formed in the tooth 49. The lug 60 in the tooth 49 extends across the recess 58. The notch 59 in the end portion 47 is somewhat larger or wider than the lug 60 is thick thereby permitting or allowing the tooth 49 to be moved somewhat longitudinally on the end portion 47. A clamping screw 61 is carried in the end portion 47 so as to extend through the extreme end portion of the flight into the notch 59. The inner end of the clamping screw 61 is provided with a reduced portion 63 which forms a shoulder 64. The reduced portion 63 of the screw 61 fits or extends comparatively loosely into an aperture 65 in the lug 60 to allow the shoulder 64 to engage the lug. It will be readily understood how turning of the screw 61, so as to cause it to move inwardly, causes the tooth 49 to be moved on the end portion 47 in the direction indicated by the arrow in Fig. 10, thereby causing the tooth 49 to press or bear against the uppermost tooth 48. This causes the teeth 48 to be held firmly against each other along the entire length of the flight 11 and prevents working or shifting of the teeth on the flight.

In practice, when assembling the cutter the bottom or end tooth 17 is the first to be put in place. Following the bottom or end tooth 17 is the lowermost tooth 48 which engages the projections 35 to lock the end tooth against radial displacement. When the lowermost tooth 48 is in place additional teeth 48 are slid onto the flight 11 until it is full or covered. It is preferred that during the placing of the teeth on the flight they be driven or forced tightly together so that there will be no danger of them working loose or creeping when the cutter is put in operation. When the proper number of teeth 48 have been placed on the flight 11 the locking tooth 47 is put in place and tightened or pressed against the uppermost tooth 48 to hold all of the teeth 48 in place against each other. A locking plate 70, having an aperture 71 which fits the head 72 of clamping bolt 63, is preferably placed over the head of the clamping bolt 61 and secured to the end portion 47 by suitable screws 75, in order to lock the clamping screw against working loose.

Having described a preferred form of our invention, I claim:

1. In a cutter of the character described, two members one a flight the other a tooth, and means for holding the tooth on the flight against longitudinal displacement, said means comprising a projection on one of the members to engage a recess in the other.

2. In a cutter of the character described, a flight, a tooth adapted to be arranged over the end portion of the flight, a projection on the flight to engage a recess in the tooth and hold the tooth against longitudinal movement on the flight.

3. In a cutter of the character described, two members one a flight the other a tooth, and means for holding the tooth on the flight against longitudinal displacement, said means comprising a radially disposed projection on one of the members to engage a radially disposed recess in the other member.

4. In a cutter of the character described, a flight, two teeth on the flight, means for holding one of the teeth against radial displacement from the flight, and means for holding the other tooth against radial displacement from the flight, one of said means comprising a projection on one of the teeth to be engaged by the other tooth.

5. In a cutter of the character described, a flight, a tooth arranged on the flight, a projection on the tooth, and a second tooth for holding the first mentioned tooth on the flight against radial displacement, the second tooth being adapted to engage and extend over the projection on the first mentioned tooth.

6. In a cutter of the character described, a flight, a tooth arranged on the flight, projections on opposite sides of the tooth, the projections having rearwardly diverging outer surfaces and parallel inner walls, a second tooth arranged on the flight, the second tooth having rearwardly diverging walls to engage the outer surfaces of the projections and flanges on said walls to engage the inner walls of the projections and hold the first mentioned tooth on the flight against radial displacement.

7. In a cutter of the character described, a flight, a tooth arranged over the end portion of the flight, two longitudinally disposed projections on the tooth at opposite sides of the flight, a second tooth on the flight, the second tooth having rearwardly extending side walls which engage the projections to hold the first mentioned tooth against outward radial movement relative to the second tooth, and means for locking the second tooth on the flight against radial displacement.

8. In a cutter of the character described, two members one a flight the other a tooth, means for holding the tooth on the flight against longitudinal displacement, said means comprising a projection on one of the members to engage a recess in the other, a second tooth arranged on the flight and held against radial displacement, and means for holding the first mentioned tooth on the flight against radial displacement, said means comprising a projection on one of the teeth to be engaged by the other tooth.

9. In a cutter of the character described, two members one a flight the other a tooth, means for holding the tooth on the flight against longitudinal displacement, said means comprising a radially disposed projection on one of the members to engage a recess in the other, a second tooth arranged on the flight and held against radial displacement, and means for holding the first mentioned tooth on the flight against radial displacement, said means comprising a longitudinally disposed projection on one of the teeth to be engaged by the other tooth.

10. In a cutter of the character described, a flight, a tooth arranged over the end portion of the flight, a radially disposed projection on the flight to engage a recess in the tooth and hold the tooth against longitudinal displacement on the flight, a second tooth arranged on the flight, means for holding the second tooth on the flight, and means for holding the first mentioned tooth on the flight against radial displacement, said means comprising a longitudinally disposed projection on the first mentioned tooth to be engaged by the second tooth.

11. In a cutter of the character described, a flight, a tooth adapted to be arranged over the end portion of the flight, means for holding the tooth against radial displacement on the flight, and a projection on the flight to engage a recess in the tooth and hold the tooth against longitudinal displacement on the flight.

12. In a cutter of the character described, a flight, a tooth arranged on the flight, means for holding the tooth against longitudinal displacement on the flight, a projection on the tooth, and a second tooth for holding the first mentioned tooth on the flight against radial displacement, the second tooth being adapted to engage and extend over the projection on the first mentioned tooth.

13. In a cutter of the character described, a flight, a tooth arranged over the end portion of the flight, two longitudinally disposed projections on the tooth at opposite sides of the flight, the projections having rearwardly diverging outer surfaces, radially disposed projections on the flight to engage recesses in the tooth and hold the tooth against longitudinal displacement on the flight, a second tooth on the flight, the second tooth having rearwardly diverging walls which engage the outer surfaces of the projections to hold the first mentioned tooth against outward radial movement relative to the second tooth, and means for holding the second tooth on the flight against radial displacement.

14. In a cutter of the character described, a flight, a longitudinal projection on the flight, said projection having a substantially vertical inner wall, a tooth arranged on the flight, a longitudinally disposed projection on the tooth, and a second tooth arranged on the flight, a second tooth having an inwardly extending wall which extends over both of the projections, and a flange at the inner end of the wall to engage the inner wall of the projection on the flight.

15. In a cutter of the character described, a flight, longitudinally disposed projections on opposite sides of the flight, radially disposed projections on opposite sides of the flight at its end portion, a tooth having in it recesses and arranged over the end portion of the flight so that the radially disposed projections extend into the recesses, longitudinally disposed projection on the tooth to be on opposite sides of the flight when the tooth is on the flight, and a second tooth arranged on the flight, the second tooth having walls which extend over the longitudinally disposed projections on the flight and the projections on the first mentioned tooth.

16. In a cutter of the character described, a flight, a plurality of teeth arranged on the flight and held against radial displacement therefrom, a locking tooth arranged on the flight, and means for moving said locking tooth on the flight and against the said teeth.

17. In a cutter of the character described, a flight, a plurality of teeth arranged on the flight, means for holding said teeth against radial displacement on the flight, a locking tooth arranged on the flight, and means for holding the locking tooth on the flight against radial displacement and moving it longitudinally on the flight against one of said teeth.

18. In a cutter of the character described, a flight, a projection on the flight, a plurality of teeth arranged on the flight, flanges on said teeth to engage said projection and prevent radial displacement of the teeth from the flight, a locking tooth arranged at one end of the flight, and means for holding the locking tooth on the flight against radial displacement and means for moving it longitudinally on the flight, said means comprising a screw arranged in the flight to engage the tooth.

19. In a cutter of the character described, a flight having a recess at one end, a plurality of teeth arranged on the flight and held against radial displacement from the flight but movable longitudinally thereon, a locking tooth arranged at the end of the flight, a lug on said tooth to extend into the recess on the flight, and a clamping screw carried in the flight to extend into the recess and engage the lug to move the tooth longitudinally on the flight against the plurality of teeth.

20. In a cutter of the character described, a flight, a projection on the flight, a plurality of teeth arranged on the flight, flanges on the teeth to engage the projection and prevent radial displacement of the teeth from the flight, and means at the ends of the flight to prevent displacement of the teeth therefrom.

21. In a cutter of the character described, a flight, projections on opposite sides of the flight, said projections having inwardly diverging outer surfaces and inner walls substantially perpendicular to the plane of the flight, a plurality of teeth arranged on the flight, the teeth having inwardly diverging walls which engage the outer surfaces of the projections, flanges at the inner edges of the wall of the teeth to engage the inner walls of the projections, and means at the ends of the flights to prevent displacement of the teeth therefrom.

22. In a cutter of the character described, a flight, a tooth arranged at one end of the flight and held against radial and longitudinal displacement, a plurality of teeth arranged on the flight, and a tooth arranged at the other end of the flight, said last mentioned tooth being held on the flight against radial displacement and adapted to be moved on the flight to hold said plurality of teeth together and against the first mentioned tooth.

23. In a cutter of the character described, a flight, a tooth arranged at one end of the flight, means for holding the tooth on the flight against longitudinal displacement, said means comprising a projection on the flight which engages a recess in the tooth, a longitudinal projection on the flight, a plurality of teeth arranged on the flight, flanges on the teeth to engage the longitudinal projection on the flight and hold the teeth against radial displacement, a locking tooth arranged at the other end of the flight and held against displacement, and means for moving the locking tooth on the flight to clamp said plurality of teeth between said locking tooth and the first mentioned tooth.

24. In a cutter of the character described, a flight, a radially disposed projection at one end of the flight, a longitudinally disposed projection on the flight, a tooth arranged on the flight so that said radially disposed projection engages a recess in it to hold it against longitudinal displacement on the flight, radially disposed projections on said tooth, a plurality of teeth arranged on the flight, flanges on said last mentioned teeth to engage the longitudinal projections on the flight and hold the teeth against radial displacement from the flight, one of said plurality of teeth engaging the projections on the first mentioned tooth as well as the longitudinal projections on the flight to hold the first mentioned tooth against radial displacement from the flight, a locking tooth at the other end of the flight, and means for holding said locking tooth on the flight against radial displacement and moving it on the flight against said plurality of teeth to hold them together and against the first mentioned tooth.

25. In a cutter of the character described, a hub, and a ribbon flight carried on said hub by spokes, one end of said flight being arranged to project beyond the end of said hub.

26. In a cutter of the character described, a hub, and a ribbon spiral flight carried on said hub by spokes, said flight having mounted on it removable teeth and having one end arranged to extend beyond the end of the hub.

27. In a cutter of the character described, a hub, and two ribbon spiral flights mounted on said hub by spokes, said flights being arranged diametrically opposite each other relative to the hub and said flights being of different lengths and each arranged to have an end extending beyond the end of the hub at the same end of the cutter.

In witness that I claim the foregoing I have hereunto subscribed my name this 24th day of February, 1920.

WILLIAM van den HEUVEL.

Witness:
VIRGINIA BERINGER.